United States Patent [19]

Nakamura et al.

[11] Patent Number: 4,555,004
[45] Date of Patent: Nov. 26, 1985

[54] TEMPERATURE RESPONSIVE FLUID COUPLING DEVICE

[75] Inventors: Ryuji Nakamura, Okazaki; Masaharu Hayashi, Toyota, both of Japan

[73] Assignee: Aisin Seiki Kabushiki Kaisha, Kariya, Japan

[21] Appl. No.: 474,962

[22] Filed: Mar. 14, 1983

[30] Foreign Application Priority Data

Mar. 17, 1982 [JP] Japan .................................. 57-40756

[51] Int. Cl.⁴ ........................ F16D 35/00; F16D 43/25
[52] U.S. Cl. .................................. 192/58 B; 192/82 T
[58] Field of Search ............................ 192/58 B, 82 T

[56] References Cited
U.S. PATENT DOCUMENTS

| | | | |
|---|---|---|---|
| 3,943,893 | 3/1976 | Tsubaki et al. | 192/58 B |
| 3,983,981 | 10/1976 | Snodgrass et al. | 192/58 B |
| 4,064,980 | 12/1977 | Tinholt | 192/58 B |
| 4,295,550 | 10/1981 | Hayashi . | |
| 4,298,111 | 11/1981 | Hayashi . | |
| 4,351,426 | 9/1982 | Bopp | 192/58 B |
| 4,469,209 | 9/1984 | Hayashi et al. | 192/58 B |

Primary Examiner—George H. Krizmanich
Attorney, Agent, or Firm—Oblon, Fisher, Spivak, McClelland & Maier

[57] ABSTRACT

A temperature responsive fluid coupling device which can precisely control the transmitting torque between an input coupling member driven and an output coupling member in three steps in response to changes of ambient temperature of the output coupling member. The fluid coupling device includes two labyrinth operating chambers functioning as a torque transmitting mechanism, and each operating chamber includes a fluid return opening and a pumping mechanism.

8 Claims, 3 Drawing Figures

TEMPERATURE RESPONSIVE FLUID COUPLING DEVICE

BACKGROUND OF THE INVENTION

1. Field of the Invention

This invention relates to fluid coupling devices in general, and more particularly to a temperature responsive fluid coupling device which controls the rotation of a cooling fan of an internal combustion engine in response to changes of ambient temperature.

2. Description of the Prior Art

Fluid coupling devices of this type control the amount of fluid conducted from a reservoir chamber to a working chamber in response to changes of engine ambient temperature in order to prevent the engine from being overcooled and to reduce the horsepower loss of the engine. There has been introduced a fluid coupling device which controls transmitting torque in three steps by means of selectively opening and closing a fluid return opening by a valve plate.

A conventional fluid coupling device of this type which controls transmitting torque in three steps in response to changes of ambient temperature comprises basically the following construction. That is to say, the fluid coupling device includes an input coupling member having a rotatable rotor, an output coupling member rotating relative to the input coupling member, a dividing plate dividing an interior of the output coupling member into a reservoir chamber for a viscous shear fluid and a working space accommodating the rotor, a plurality of operating chambers formed between a side surface of the rotor and an inner surface of the output coupling member, a plurality of fluid return openings formed through the dividing plate to provide the fluid to the operating chamber, a pumping mechanism discharging the fluid from the operating chambers to the reservoir chamber, and temperature responsive means controlling the amount of the fluid transferred from the reservoir chamber to the operating chambers by means of opening and closing the fluid return openings in response to changes of ambient temperature.

In the above-mentioned conventional fluid coupling device, however, both the fluid transfer to the operating chambers and the fluid discharge therefrom which are accompanied by the movement of the valve plate cannot be smoothly and precisely accomplished. Therefore, the transmitting output torque has a relatively large hysteresis curve produced between the increasing process (shown in FIG. 3 by lines d, e and f) and in the decreasing process, and in an extreme case it may be difficult to precisely control the transmitting output torque in the decreasing process in the three steps.

SUMMARY OF THE INVENTION

An object of the present invention is to eliminate the disadvantages of the prior art fluid coupling device.

More particularly it is an object of the present invention to provide a temperature responsive fluid coupling device which can control exactly a transmitting torque between an input member and an output member in three steps in response to changes of ambient temperature.

Another object of the present invention is to provide a temperature responsive fluid coupling device where there are two operating chambers functioning as a torque transmitting mechanism, each operating chamber includes a fluid return opening and a pumping mechanism, and wherein the pumping mechanisms do not interfere with each other.

A further object of the present invention is to provide a new and improved temperature responsive fluid coupling device which is comparatively simple and compact in construction and thoroughly reliable in operation, and which is economical to manufacture.

In one illustrative embodiment of the present invention, there is provided a fluid coupling device which includes a first operating chamber formed between a rotor accommodated in a working space and a power output member, a second operating chamber formed between the rotor and a dividing plate dividing the interior of the power output member into a reservoir chamber and the working space, a first return opening and a second return opening transferring viscous fluid from the reservoir chamber to the first and second operating chambers respectively, and a first and second pumping mechanism operating independently and without interfering with each other so that the viscous fluid may be completely discharged from the first and second operating chambers, respectively. When the first and second return openings are opened in response to a rise in temperature, the viscous fluid can be transferred to the first and second operating chambers, thereby increasing transmitting torque between a power input member and the power output member. When the first and second return openings are shut in response to a drop in temperature, the viscous fluid can be completely discharged from the first and second operating chambers by means of the first and second pumping mechanism, respectively, thereby decreasing the transmitting torque between the power input and output members.

According to the above-noted construction, since the viscous fluid can be rapidly transferred to each operating chamber and also the viscous fluid can be rapidly discharged from each operating chamber, the transmitting torque can be exactly controlled with a prompt response and small hysteresis in response to changes of ambient temperature. Furthermore, since the first and second operating chambers are formed in both sides of the rotor, respectively, it may be possible to make the coupling device compact and to set the range of the transmitting torque to be large.

It may be desirable to form the operating chambers as a labyrinth. The transmitting surfaces have a large area so that the transmitting torque may be attained as much as possible in a device having a small diameter. Additionally, for the same purpose, labyrinth type operating chambers can be formed in the outer circumferential position on both sides of the rotor.

BRIEF DESCRIPTION OF THE DRAWINGS

The above-noted as well as further objects, features and attendant advantages of the present invention will be understood more clearly and fully from the following detailed description of a preferred embodiment thereof, when read with reference to the accompanying drawings, in which.

DESCRIPTION OF THE PREFERRED EMBODIMENT

Figure 1:
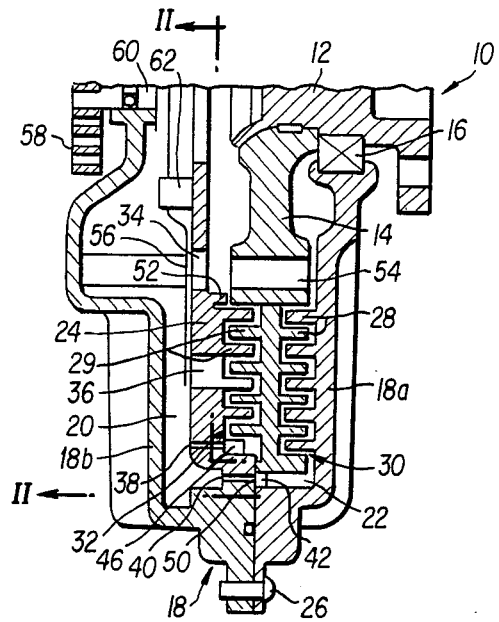
FIG. 1 is an axial sectional view of a fluid coupling device embodying the present invention.

Referring now to FIG. 1, a temperature responsive fluid coupling device 10 of the present invention comprises basically a driving shaft 12 driven by an engine through a pulley (not shown), a rotor 14 fixedly secured on the driving shaft 12 by key means or spline means for rotating with the driving shaft 12 as a single body, a casing member 18 retractably mounted on the driving shaft 12 through a bearing 16 and provided with a space to accommodate the rotor 14, and a dividing plate 24 dividing the interior of the casing member 18 into a fluid reservoir chamber 20 for a viscous shear fluid and a working space 22. The driving shaft 12 functions as a power input member, while the casing member 18 functions as a power output member.

The casing member 18 comprises an inner casing member 18a mounted on the driving shaft 12 through the bearing 16 and an outer casing member 18b sealingly secured to the inner casing member 18a in a convenient manner such as by a screw.

A well-known fan assembly is installed in the casing member 18 by convenient conventional means so as to blow air to the engine (rightwards in FIG. 1) behind the coupling device 10. The rotor 14 is in the form of a disc-shaped plate rotatably accommodated in the working space 22 formed between the dividing plate 24 and the inward casing member 18a.

A first (rightward) surface of the rotor 14 and a first (leftward) surface of the inner casing member 18a, which face each other, are provided with a plurality of circumferentially extending projections 28 which extend axially and are radially positioned a predetermined space alternately, thereby forming a first labyrinth operating chamber 30 which transmits torque from the rotor 14 to the inner casing member 18a by means of the shear action of a viscous fluid such as a silicon oil disposed between the projections 28 upon rotation of the driving shaft 12 and more particularly, rotor 14. Similarly, a second (leftward) surface of the rotor 14 and a first (rightward) surface of the dividing plate 24, which face each other, are provided with a plurality of circumferentially extending projections 29 which extend axially and are radially positioned at a predetermined space alternately, thereby forming a second labyrinth operating chamber 32 which transmits torque from the rotor 14 to the dividing plate 24, namely the casing member 18, by means of the shear action of the viscous fluid disposed between the projections 29 upon the rotation of the rotor 14.

Fixedly secured to the outer casing member 18b is the dividing plate 24 which divides the interior of the casing member 18 into the reservoir chamber 20 for the viscous fluid and the working space 22 in which the rotor 14 rotates. In the dividing plate 24 there are provided a first fluid return opening 34, a second fluid return opening 36, a second pumping opening 38 and a first pumping opening 40 which are in the form of an axially extending passageway and which are positioned in order in a radial direction. The second pumping opening 38 forms a second pumping mechanism 44 with an impeller 46, while the first pumping opening 40 forms a first pumping mechanism 48 having an impeller 42. The first and second pumping mechanisms 44 and 48 are prevented from interfering with each other due to a small clearance 50 formed between the dividing plate 24 and the rotor 14. The viscous fluid transferred from the first fluid return opening 34 to the first labyrinth operating chamber 30 is prevented from being transferred to the second labyrinth operating chamber 32 due to the existence of a partition wall 52 formed as a unitary part of the dividing plate 24.

The first fluid return opening 34 supplies the viscous fluid from the reservoir chamber 20 to the first labyrinth operating chamber 30 through a slot 54 formed in the rotor 14, while the second fluid return opening 36 supplies the viscous fluid from the reservoir chamber 20 to the second labyrinth operating chamber 32. The first and second fluid return openings 34 and 36 are opened and closed selectively by rotational action of valve plate 56 sliding on a surface of the dividing plate 24.

Figure 2:
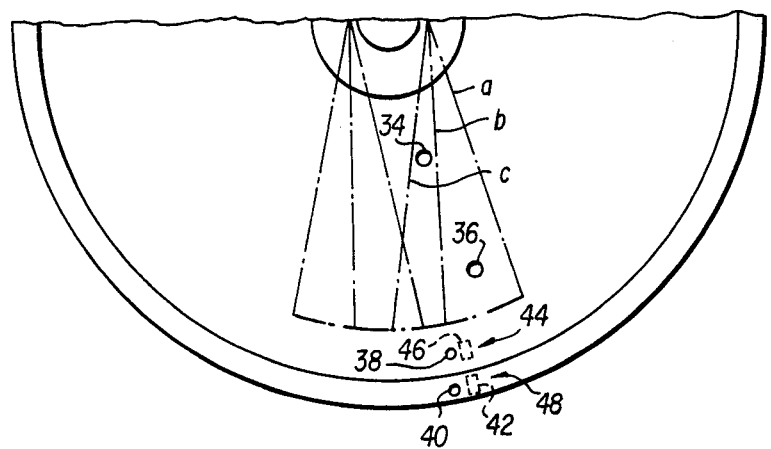
FIG. 2 is a sectional view taken along line II—II of FIG. 1.

The valve plate 56 is in the form of a rectangular plate as viewed in FIG. 2 and is rotated by a temperature responsive member such as a bimetal spiral spring member 58 mounted on a front surface of the outer casing member 18b. The outer end of the bimetal spring 58 is secured to the outer casing member 18b, while the inner end of the bimetal spring 58 is secured to a rod 60 rotatably supported by the outer casing member 18b. Accordingly, the valve plate 56 is rotated as viewed in FIG. 2 in response to changes in ambient temperature of the casing member 18, thereby opening and closing the first and second fluid return openings 34 and 36.

Figure 3:
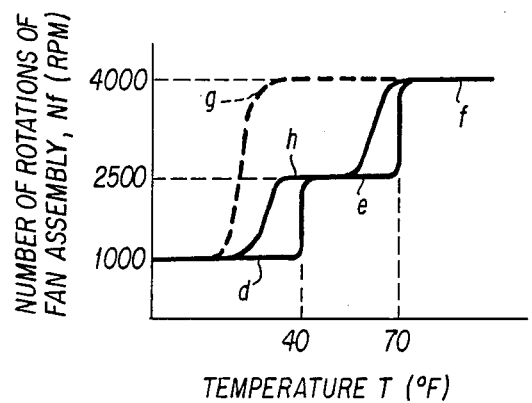
FIG. 3 is a characteristic graph of the operation of the fluid coupling device.

In operation of the fluid coupling device 10, first when the ambient temperature of the casing member 18 is below a first predetermined temperature (for example below 40° C.), the valve plate 56 will be maintained in the position where the rightward end of the valve plate 56 is in contact with a stopper 62 as shown by reference letter a in FIG. 2, thereby closing both the first and second fluid return openings 34 and 36. Consequently, the viscous fluid is not supplied from the reservoir chamber 20 to both the first and second labyrinth operating chambers 30 and 32. Since the viscous fluid is discharged from both the first and second labyrinth operating chambers 30 and 32 to the reservoir chamber 20 by the first and second pumping mechanisms 48 and 44, the amount of the viscous fluid in the first and second labyrinth operating chambers 30 and 32 will become substantially a minimum quantity. Accordingly, the casing member 18, namely the fan assembly (not shown), will be driven at a slower rotational speed as shown by line d in FIG. 3.

Secondly, when the bimetal spring 58 detects a second predetermined temperature (for example a temperature from 40° C. to 70° C.), the valve plate 56 will be maintained in the position where the valve plate 56 releases only the second fluid return opening 36 as shown by reference letter b in FIG. 2, thereby supplying the viscous fluid to only the second labyrinth operating chamber 32. Consequently, the fan assembly will be driven at a middle speed to be rotated as shown by line e in FIG. 3. In this case the partition wall 52 prevents the viscous fluid from flowing from the second labyrinth operating chamber 32 to the first labyrinth operating chamber 30.

Thirdly, when the bimetal spring 58 detects a third predetermined temperature (for example above 70° C.), the valve plate 56 will be maintained in the position where the valve plate 56 releases both the first and second fluid return openings 34 and 36 as shown by reference letter c in FIG. 2, thereby supplying the viscous fluid to both the first and second labyrinth operating chambers 30 and 32. Accordingly, the transmitting torque will become a maximum value, and the fan assembly will then be driven at a faster speed so as to be rotated as shown by a line f in FIG. 3.

Next, when the ambient temperature of the casing member 18 drops gradually and reaches the second predetermined temperature the first fluid return opening 34 will be closed by the valve plate 56, whereby the viscous fluid is discharged from the first labyrinth operating chamber 30 into the reservoir chamber 20 by the first pumping mechanism 48. Consequently, the r.p.m's of the fan assembly will decrease. When the ambient temperature drops further and reaches the first predetermined temperature, both the first and second fluid return openings 34 and 36 will be closed by the valve plate 56, whereby the r.p.m's of the fan assembly becomes the minimum value. During the drop in ambient temperature, the r.p.m.'s of the fan assembly decreases as shown by line h with a downwardly extending arrow in FIG. 3.

The first and second pumping mechanisms 48 and 44 are positioned outside of the first and second labyrinth operating chambers 30 and 32, respectively, and are also located in different chambers divided by the clearance 50 from each other so as to prevent mutual interference. It would be desirable to form the first and second pumping mechanisms 48 and 44 so as to be radially adjacent in a peripheral portion of the dividing plate 24. It would be also possible to form the first pumping mechanism 48 on an inner surface portion of the casing member 18.

From the foregoing it will be apparent that the present invention has provided a temperature responsive fluid coupling device which can precisely control transmitting torque by three steps during the rise and fall in ambient temperature. Large torque transmitting surfaces can be formed by means of positioning the labyrinth operating chambers in both sides of the rotor.

It would be obvious to those skilled in the art that various changes may be made without departing from the spirit of the intention and therefore the invention is not limited to what is shown in the drawing and described in the specification, but only as indicated in the appended claims.

What is claimed as new and is intended to be secured by Letters Patent is:

1. A temperature responsive fluid coupling device, comprising:
   a power input coupling member having a rotatable rotor mounted thereon;
   a power output coupling member for rotating relative to said power input member;
   a dividing plate dividing an interior portion of said power output coupling member into a reservoir chamber for a viscous fluid and a working space accommodating said rotatable rotor;
   a first operating chamber formed between said rotatable rotor and said power output coupling member;
   a second operating chamber formed between said rotatable rotor and said dividing plate;
   said dividing plate having first and second fluid return openings formed therein so as to supply said viscous fluid from said reservoir chamber to said first and second operating chambers;
   a first pumping mechanism located in said first operating chamber for discharging said viscous fluid from said first operating chamber;
   a second pumping mechanism located in said second operating chamber for discharging said viscous fluid from said second operating chamber into said reservoir chamber independent of said first pumping mechanism;
   a temperature responsive member operatively associated with said power output coupling member;
   a valve plate connected to said temperature responsive member and which is slidingly and rotatably mounted on said dividing plate via said temperature responsive member for selectively opening and closing only said first and second fluid return openings thereby controlling the amount of viscous fluid transferred from said reservoir chamber to said first and second operating chambers in response to changes of ambient temperature of said power output coupling member and independent of operation of said first and second pumping mechanisms;
   said dividing plate and said rotatable rotor having a clearance formed therebetween so as to prevent said first and second pumping mechanisms from interfering with each other in operation; and
   a partition wall, formed as a unitary part of said dividing plate, for preventing said viscous fluid from being transferred from said first operating chamber to said second operating chamber.

2. A temperature responsive fluid coupling device according to claim 1 wherein each said first and second operating chambers further comprises a labyrinth chamber.

3. A temperature responsive fluid coupling device according to claim 2 wherein said labyrinth chamber comprises a plurality of circumferentially extending projections which extend axially and are radially spaced at predetermined alternate positions.

4. A temperature responsive fluid coupling device according to claim 1 wherein said first and second pumping mechanisms further comprise first and second pumping openings respectively formed in said dividing plate.

5. A temperature responsive fluid coupling device according to claim 4 wherein said first and second fluid return openings and said first and second pumping openings are in the form of axially extending passageways and are respectively positioned in order in a radial direction.

6. A temperature responsive fluid coupling device according to claim 1 wherein said first and second pumping mechanisms are positioned so as to be radially adjacent in a peripheral portion of said dividing plate.

7. A temperature responsive fluid coupling device according to claim 1 wherein said valve plate further comprises a rectangular plate.

8. A temperature responsive fluid coupling device according to claim 1 wherein said temperature responsive member further comprises a bimetal spiral spring member mounted on a front surface portion of said power output coupling member.

* * * * *